July 20, 1965 S. S. MEISLER 3,195,445
BALE PRESS
Filed Jan. 7, 1963
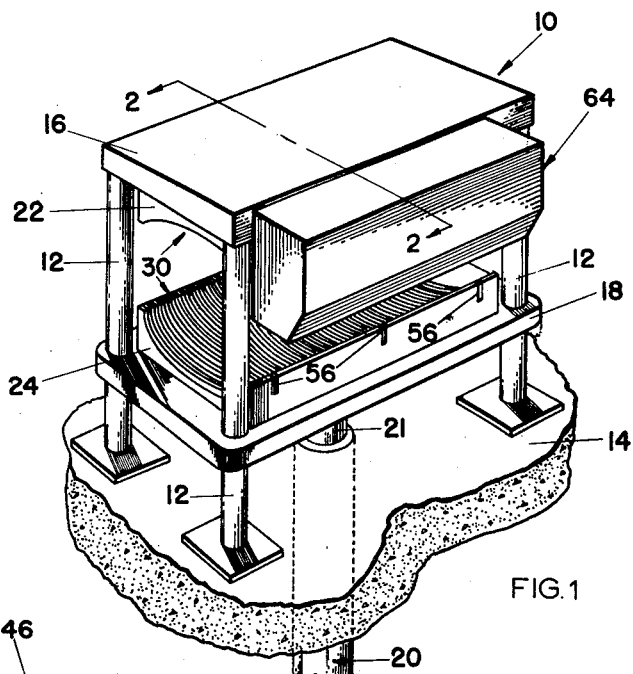
FIG. 1
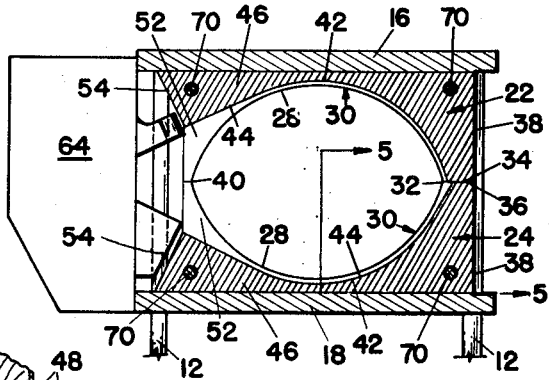
FIG. 2
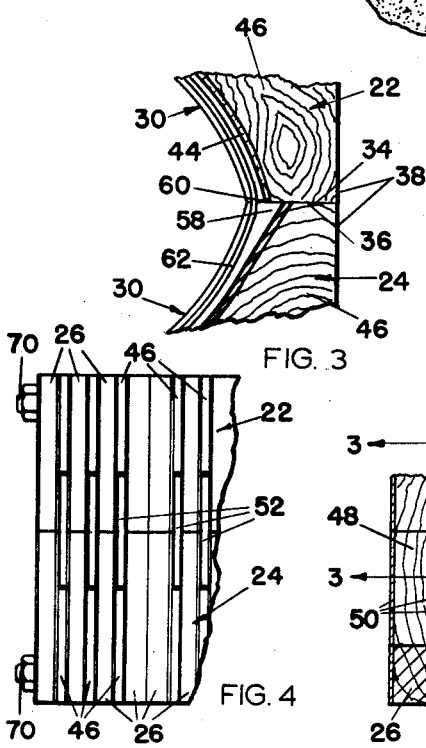
FIG. 3
FIG. 4
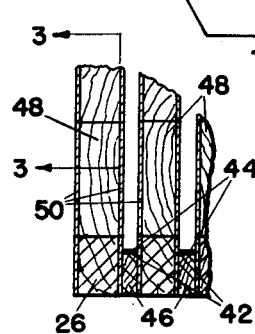
FIG. 5
INVENTOR.
SIDNEY S. MEISLER
BY United States Patent Office 3,195,445
Patented July 20, 1965

3,195,445
BALE PRESS
Sidney S. Meisler, Box 536, Wapato, Wash.
Filed Jan. 7, 1963, Ser. No. 249,786
1 Claim. (Cl. 100—26)

This invention relates to baling presses and more particularly to a novel baling press for forming bales and applying a number of tie wires therewith.

Baling presses are becoming of increasing importance in industry because, thereby, certain products may be particularly shaped and their density increased to facilitate storage and handling. One particularly noteworthy application of a baling press is disclosed in my previous United States Patent No. 2,674,535. This present invention is an outgrowth of said patent and a subsequent copending application filed January 13, 1961, under Serial No. 82,564, now abandoned, and entitled Apparatus for Recompressing Hops Into Cylindrical Bales.

It is customary to press relatively loosely formed bales of hops by hydraulic pressure to a desired reduction in size which produces a resultant increase in density. The bale is then enclosed in an envelope of desired material and lateral expansion is precluded by employing plural non-extensile bands. Heretofore, this has been accomplished by means of dies as disclosed in said prior patent wherein the complementary dies are formed on a circular arc, provided with spaced slots through which the wire or banding strands are inserted by a man from one side and then by another man are returned to the first side through the slots of the opposite die thus encircling the bales. The wires are then manually tied, whereupon the dies are parted and the bale is ejected.

My present invention eliminates the need for one of the workmen and materially speeds up the process of recompressing hops by providing a unique apparatus for mechanically banding the recompressed bales. Such apparatus includes as an important feature thereof, unique cooperating dies which when disposed in the fully closed mating position, define complemental ways through which the banding material may be passed by a power strapping machine, for example, as shown in Patent No. 2,915,003, dated December 1, 1959.

It is therefore an object of the present invention to provide apparatus for recompressing hops into cylindrical bales confined against expansion by plural bands supplied by a powered strapping machine, thus materially increasing the speed with which finished bales may be completed and therefore materially decreasing the cost of so doing.

A further object of the present invention lies in the provision of an improved pair of complemental shaping dies by means of which a band may be caused to encircle a bale contained in the fully closed mating dies by passing the band thereabout from one side of the bale press.

Another object of the present invention lies in the provision of an improved bale press having a pair of complemental shaping dies which, when in said mating position, provide complemental ways through which bale banding material may be passed by a power strapping machine.

It is yet another object of the present invention to provide a bale press of the character described which guides a band around bales recompressed therein and thus decreases the time and money necessary for producing the finished cylindrical bales.

Other objects of the present invention will become apparent in the course of the following specification.

The invention will appear more clearly in the following detailed description when taken in conjunction with the accompanying drawings showing by way of example, a preferred embodiment of the inventive concept.

In the drawings:

FIGURE 1 is a perspective view having portions broken away for convenience of illustration of my improved bale press;

FIGURE 2 is a fragmentary lateral vertical sectional view taken substantially on the plane as indicated by line 2—2 of FIGURE 1;

FIGURE 3 is an enlarged fragmentary vertical section taken substantially on the plane indicated by line 3—3 of FIGURE 5;

FIGURE 4 is a fragmentary vertical side elevation of a portion of the complemental dies in their mating relationship; and FIGURE 5 is an enlarged fragmentary section taken substantially on the plane indicated by the line 5—5 of FIGURE 2.

Having reference now more particularly to the drawings, wherein like reference numerals are employed to indicate like parts, the reference numeral 10 indicates the press in which two bales (not shown) are recompressed and changed from rectangular bales to one having a cross section dictated by the configuration of the shaping dies.

The press may be provided as is conventional, with four corner posts, 12—12 which are securely anchored as, for example, to the floor 14. At their upper ends, the posts 12 are provided with a fixed table 16 disposed in a horizontal plane.

A vertically shiftable table 18 is journaled for vertical rectilinear movements on the four corner posts in parallel relationship to the fixed table 16.

Means 20 are provided for raising and lowering the vertically shiftable table 18 and thus applying desirable compression pressures to bales disposed between the table 16 and 18. These means are shown to be a hydraulic servo-motor which is adapted to shift the table 18 by fluid pressure. The functions of said servo-motor are controlled by any conventional controlling means adapted to extend and retract the ram 21 in accordance with manual selection.

Mounted to the underside of the fixed table 16, and to the top side of the movable table 18, I have provided a pair of complemental shaping dies 22 and 24 which, in nearly all respects, may be identical, there being one necessary difference which will subsequently appear.

Each die 22 and 24 is provided with a plurality of laminae 26—26 which have their inner edges 28—28 shaped and finished to a predetermined configuration for collectively defining a concave curvate die face 30. It will be noted that when the dies 22 and 24 are in their fully closed mating position, as shown in FIGURES 2-5, they define a circumferentially continuous oblate tube which, it has been determined, is desirable for affecting a bale of the size sought.

It is to be particularly noted that the faces 30—30 terminate at 32 in mating elongated lands 34 and 36 defined between the termination of the faces 30—30 and the lateral side edges 38—38 of the dies 22 and 24. While the drawing shows also a reduced land 40 at the opposed sides of the dies 22-24, it will be understood during the course of this specification that the presence or absence of the lands 40 is of minor consequence.

Each die face 30 is provided with longitudinally spaced laterally extending recessed walls 42 which may or may not be provided with a wear resistant lining material as seen at 44 of FIGURE 5, depending upon the base material of the spacing members 46. When the materials employed in the dies are wood fillers 48 contained within metal plates 50 and the spacing members 46 are wood, then the walls 44 are preferably metal strips to resist wear. However, when the materials are of sufficient inherent strength and wear resistance the liners or strips 44 may be omitted.

The recessed walls 42 define ways which extend laterally across the faces 30—30 and open at said faces. It is also to be noted that the ways 44 are complemental with coincident ways in the opposed dies so that a substantially continuous circumferential way is provided when the dies 22 and 24 are in the mating position.

As seen at 56 (FIGURE 1) the ways 44 are further recessed and extend through the side edges 54—54 opposed to the side edges 38—38 thus providing access openings 52 to the interior of the mating dies and while I have shown but three openings in FIGURE 1, it will be seen that any number of openings 52 may be provided which is not inconsistent with the spacers 46.

It will also be noted that the way 44 of one die 24 opposed to the openings 56 is somewhat relieved at 58 (FIGURE 3) thus defining a projection 60 at the juncture of the complementary ways 44 of the mating dies 22 and 24.

When the banding strap 62 which is automatically ejected by the power strapping machine, indicated in its entirety by the numeral 64, is passed through the complementary ways 44, it extends over the projection 60 and into the way 44 of the opposite die without "hanging up" because the seam or interruption which would normally obtain at the juncture of two mating surfaces is eliminated insofar as the ability of the strap 62 to be affected thereby thus permitting the strap to traverse the entire way around any bale that may be positioned in the mating dies and back to the power strapping machine 64 where it is tensioned and secured in a conventional manner.

The details of the power strapping machine are not shown since there are a number of machines which will accomplish the function and these details are no part of the present invention. However, for convenience of a full understanding, one power strapping machine which may be utilized is disclosed in United States Patent No. 2,915,003, dated December 1, 1959. Multiples of these machines may be employed as necessary to accommodate the number of straps desired over the length of a bale.

It will be noted that each die is made up of a plurality of laminae 26—26 spaced from each other by the spacing members 46 and united into a composite by the bolts 70.

Having thus described my invention, I desire to secure by Letters Patent of the United States the following:

In a bale press of the character described, a pair of complemental shaping dies comprising: each said die having an elongated body with a laterally curvate concave die face and mounted for relative movement into and away from mating relationship with its opposed die and defining a circumferentially continuous diametrically separable tube in the mating position; means for moving the dies into and out of mating relationship; each said die having longitudinally spaced laterally extending walls recessed in said face and forming ways opening at said face and complemental to the ways of its opposing die face to form substantially continuous guide ways each having ends; the walls being further recessed at one side of said dies to provide access openings into said dies at said guide ways and at one side only of said mating dies; and the ends of said ways of one die opposed to the said further recessed ends, each also being somewhat relieved with respect to the wall of its complemental way thus defining a projection adjacent to the end of said complemental way, whereby to eliminate a seam between the dies when in the mating position and thus preclude interference with movement of a tie wire proceeding from the complemental way over the projection and into its aligned way.

References Cited by the Examiner
UNITED STATES PATENTS

| | | | |
|---|---|---|---|
| Re. 10,902 | 2/88 | Thomas | 100—25 |
| 261,984 | 8/82 | Baxter | 100—1 |
| 266,372 | 10/82 | Krutzsch | 100—125 |
| 868,738 | 10/07 | Webb. | |
| 1,469,511 | 10/23 | Huebner | 100—295 X |
| 1,897,023 | 2/33 | Schirmer. | |
| 2,550,252 | 4/51 | Jendrisak. | |
| 2,674,535 | 4/54 | Meisler. | |
| 2,732,792 | 1/56 | White | 100—25 |
| 2,915,003 | 12/59 | Crosby et al. | 100—26 |
| 2,959,118 | 11/60 | Hager | 100—26 |
| 3,019,722 | 2/62 | Gum | 100—1 |

FOREIGN PATENTS

| | | |
|---|---|---|
| 98,347 | 6/61 | Netherlands. |

WALTER A. SCHEEL, *Primary Examiner.*
ABRAHAM G. STONE, *Examiner.*